United States Patent [19]

Senior et al.

[11] 4,074,657
[45] Feb. 21, 1978

[54] LURE

[75] Inventors: Ascanius John Senior, 1 Lavoni Street, Mosman, New South Wales, Australia; John Bernard Heaps, Lakemba, Australia

[73] Assignee: Ascanius John Senior, Mosman, Australia

[21] Appl. No.: 696,441

[22] Filed: June 15, 1976

[30] Foreign Application Priority Data

July 4, 1975 Australia ............................. 2234/75

[51] Int. Cl.² ............................................. A01K 15/00
[52] U.S. Cl. ..................................................... 119/29
[58] Field of Search ....................... 119/15.5, 29; 272/4

[56] References Cited
U.S. PATENT DOCUMENTS 1,997,010  4/1935  Nelson ....................................... 272/4
2,579,178  12/1951  Dierking ................................ 119/29

Primary Examiner—Hugh R. Chamblee
Attorney, Agent, or Firm—Ladas, Parry, Von Gehr, Goldsmith & Deschamps

[57] ABSTRACT

A lure for schooling greyhounds is provided with an electrode to which pulses of voltage are applied, and with apparatus for emitting sounds from the lure. The sounds attract the greyhound's attention and the electrical stimulation he receives when he touches the lure cause the greyhound to attack the lure and to achieve satisfaction from it. The electrical pulse generating circuitry and sound source are separate from the lure and releasable connections are provided to enable the lure and electrode to be replaced by a fresh one if damaged, without also having to replace the circuitry and sound source.

10 Claims, 5 Drawing Figures

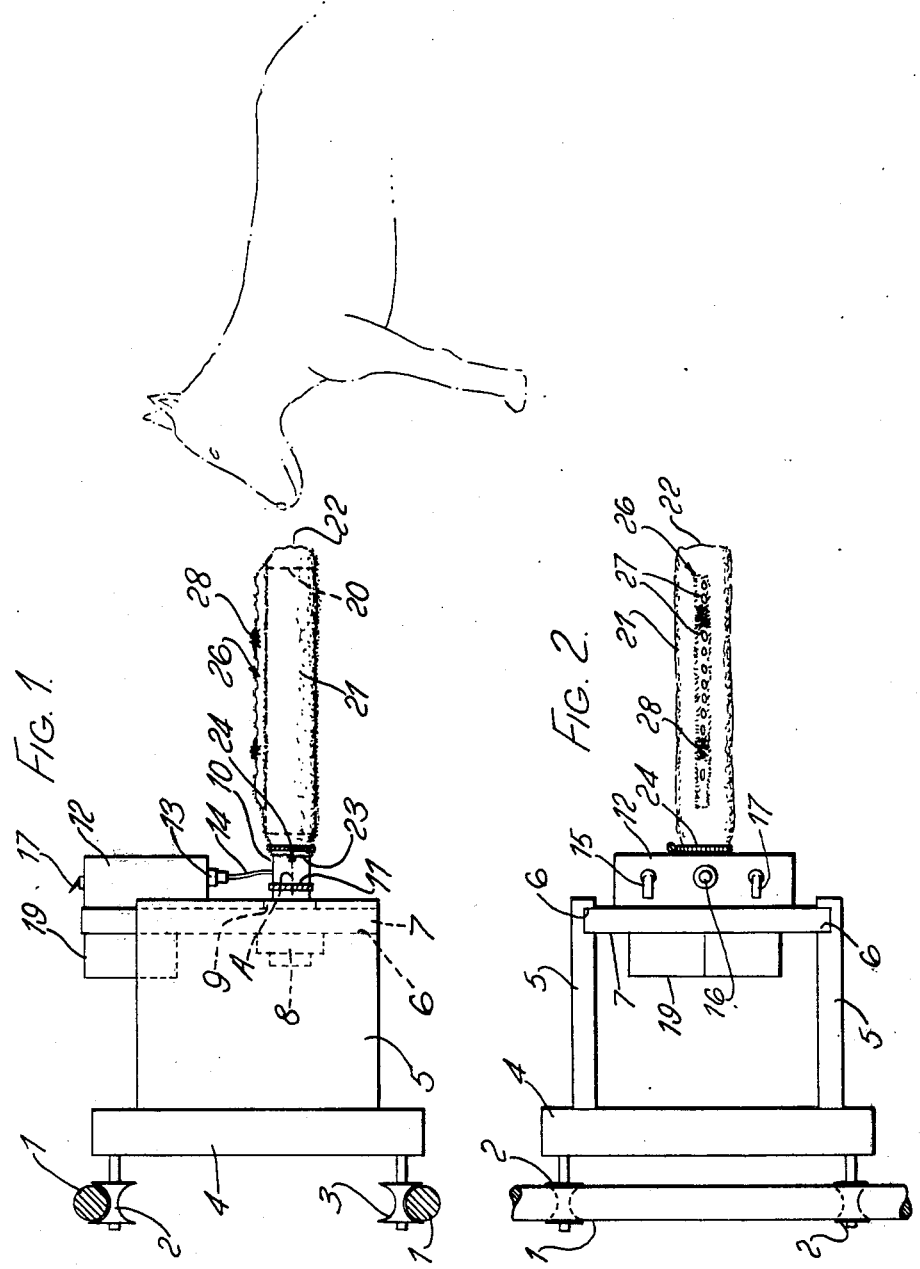

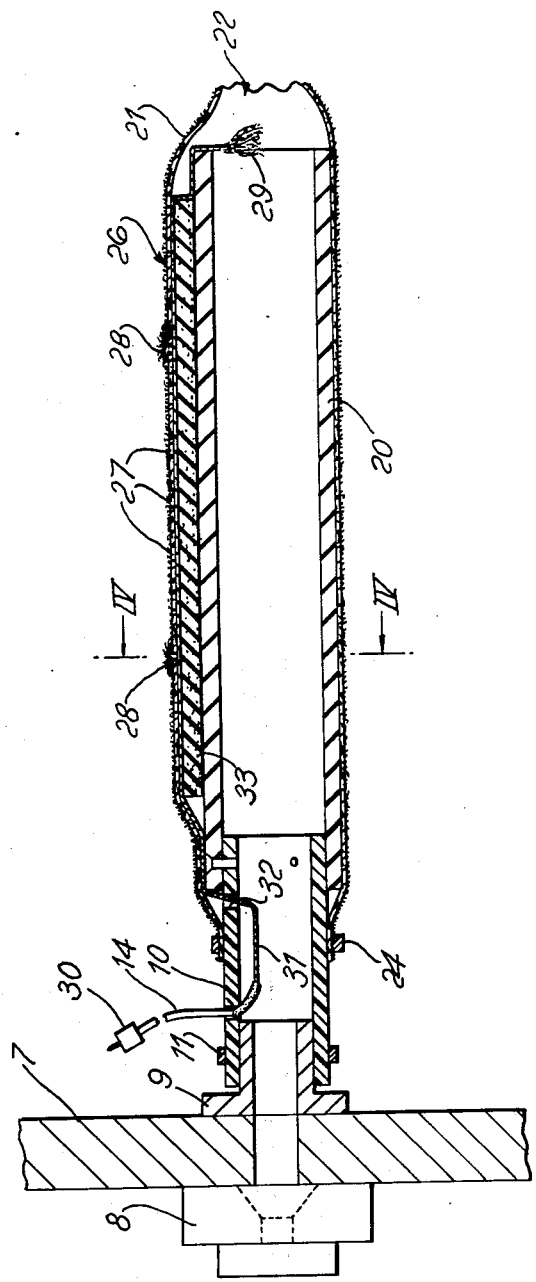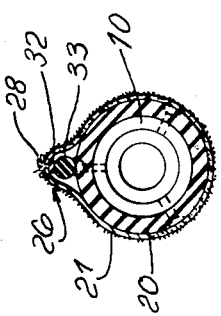

LURE

FIELD OF THE INVENTION

This invention relates to apparatus for use with racing greyhounds and is particularly concerned, although not exclusively so, with keeping racing greyhounds in top performance condition.

Greyhound racing is today a relatively large industry. Considerable money is invested in breeding greyhounds for racing and substantial returns are available for the owner of a successful racing greyhound. However, for a greyhound to be successful, it must be raced at several different courses and the betting public expects it to perform consistently at each. In practice, this means that the trainer of the greyhound has to maintain the dog's interest in racing, more particularly in chasing a lure which the dog never succeeds in catching.

STATE OF THE ART

The traditional way of keeping a dog's interest in chasing a moving lure is to allow the dog periodically to chase, catch and kill a live animal. For obvious reasons this is done out of the sight of the public, but because the public demands that a racing greyhound should always be in peak condition—meaning that the dog must be seen to display a will to catch the lure — trainers even now-a-days sometimes resort to such measures.

OBJECT OF THE INVENTION

An object of the invention is to provide a way of keeping a racing greyhound in top performance condition and which does not involve sacrificing another animal's life.

THE INVENTION

In accordance with the present invention a greyhound lure is provided with an electrode connectable to circuitry which delivers to the lure an electrical signal sufficient to stimulate the greyhound when he bites the lure without injuring or frightening the greyhound.

The invention is based on the discovery that it it possible to simulate a "fight-back" reaction from an otherwise inanimate lure by electrically energising it. By using a voltage pulse of sufficiently short time duration one avoids the sensation of shock and yet the current flow has no traumatic effect as it only flows for a time long enough to provide a stimulus to muscle fibres at the area of contact. It has been found that when a greyhound attacks and bites the lure the muscle contractions in his mouth area generates the belief that the lure is alive and fighting back. Greyhounds experiencing this stimulation will continue to savage the lure until exhausted.

A pulse having a peak voltage of 150 volts and a time duration of 0.3 milliseconds has been found to normally give adequate fight-back effect without any sensation of shock when the greyhound is standing on a damp grassed surface through which a ground return exists to the voltage circuitry. Under such conditions a typical greyhound electrical resistance is about 100,000 ohms. Under dry conditions the peak voltage pulse may have to be increased without varying the time duration but such time duration can vary within reasonable limits without producing trauma.

In practice the range of 80–150 peak volts with this type of pulse can be used by switch selection to provide degrees of fight-back varying from mild to strong in order to suit the particular temperament of timid to fierce greyhounds. Also, it is preferred for stimulus pulses to be applied at a pulse repetition frequency of 1–2 Hz.

PREFERRED FEATURES OF THE INVENTION

Preferably the lure is in the form of a hide sheath and the electrode is incorporated into it. In one suitable arrangement the hide sheath is provided with openings over the position of the electrode and the saliva of the dog wets the sheath to provide a conductive path to the dogs mouth without the dog's teeth actually biting the electrode. If desired, tufts of wire may branch from the electrode through one or two of the openings in the sheath to ensure that the dog receives the electrical "fight-back" response from the lure when he first bites it and the hide is dry.

It is necessary for a dog who has not previously seen the lure to be attracted towards it. This may be achieved by causing the lure to emit a sound which attracts the greyhound's attention. One way of achieving this is to mount the lure on the end-portion of a tube which extends to a loud speaker. If the end-portion of the lure is open and surrounds the end of the tube, the dog will approach the lure and will poke his muzzle through the open end of the sheath because the sound appears to originate there. A portion of the electrode may be arranged across the open end of the tube so that the dog receives a "fight-back" signal which immediately stimulates him into attacking the lure by biting it. Tests have shown that an ideal sound for attracting a greyhound to a lure is one of constant amplitude but sweeping upward from 700Hz to 1000Hz repeatedly at a pulse repetition rate of about 1.5Hz.

The invention will now be described in more detail, by way of example, with reference to the accompanying drawings in which:

IN THE DRAWINGS

FIG. 1 shows a rail-mounted lure in elevation and is diagrammatic;

FIG. 2 is a plan view of FIG. 1;

FIG. 3 is a vertical section through parts of the lure shown in FIG. 1;

FIG. 4 is a section through FIG. 3 taken on the line and in the direction indicated by in by the arrows IV-IV in that FIG.; and, FIG. 5 is a diagram of the electrical circuit used in the apparatus and shows wave form diagrams.

PREFERRED EMBODIMENT

Figure 5:
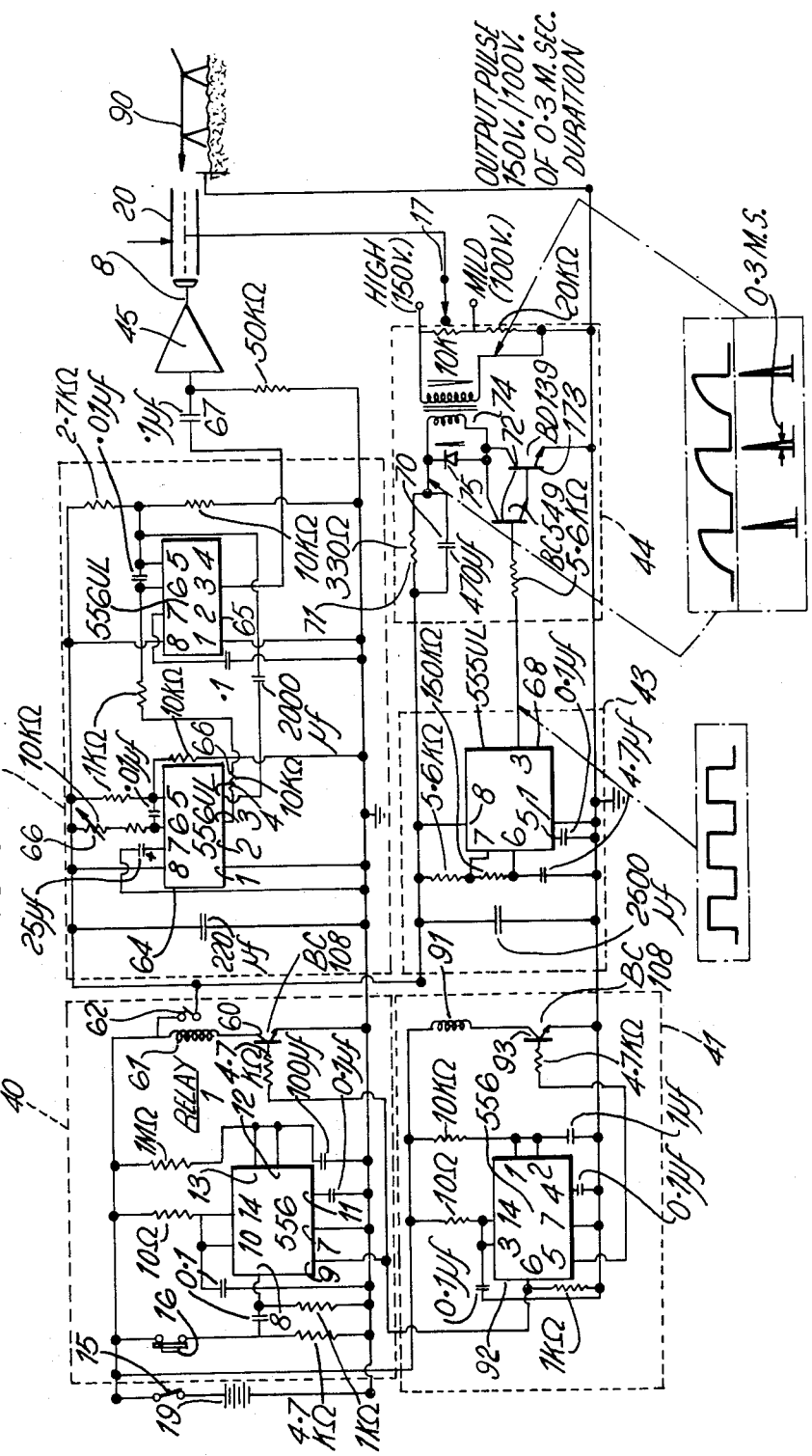

FIG. 1 shows a pair of parallel vertically spaced rails 1 on which travel two pairs of rollers 2, 3, respectively. The rollers 2,3 support a carriage 4 which may be provided with a motor (not shown) or a tow-line to enable it to run along the rail 1. The carriage 4 has a pair of parallel vertical spaced mounting plates 5, shown more clearly in FIG. 2, which are provided adjacent their ends with opposed vertical channels 6 closed at the lower end and which hold opposite vertical edge portions of a mounting plate 7 for the lure. The plate 7 can be lifted out of the channels 6 when not required. The carriage may be used for a conventional lure.

The plate 7 carries on one side a pair of electrical batteries 19 located above a loud-speaker 8. The plate 7 is provided with an opening enabling sounds from the loud-speaker 8 to be directed through the plate in the direction of the arrow A in FIG. 1. A tubular mounting nozzle 9 is mounted on the opposite side of the plate 7 to the loud-speaker 8 and enables a short section of plastics pipe 10 to be attached to the nozzle 9 by means of a circlip 11. Above the nozzle 9 is located a housing 12 containing electrical circuitry. The underside of the housing is provided with an electrical socket connector 13 into which can be plugged a lead 14 which extends downwardly through an opening in the pipe section 10 in order to energise an electrode in a lure. The top of the housing 12 is provided with an on/off switch 15, a push buttom switch 6, and a 3-position energisation switch 17.

The free end-portion of the pipe section 10 extends into a rubber tube 20 which is open at its free end. Surrounding the tube 20 is a padded lure, made from a cow-skin sleeve 21 having an open rag end 22 and its other end 23 clasped to the pipe section 10 by a circlip 24. The sleeve 21 is approximately 1 foot long and 4 inches wide. It is provided along its top surface with a padded mound 26. A line of small holes 27 is formed in the sleeve along the top of the mound and two electrode tufts 28 project through respective holes 27 and are made from braided wire which is splayed out over the top of the mound as illustrated.

FIGS. 3 and 4 show the lure in more detail. The lead 14 has a plug 30 for fitting into the socket connector 13 and passes through an opening in the pipe section 10. Inside the pipe, the lead 14 is soldered to one end of a length of flat electrical braid 31. This passes upwardly through a second opening 32 in the pipe section 10, to a position beneath the hide sheath 21 and is then glued to the outside of the rubber tube 20. The padded mound 26 is provided by a sponge rubber bar 33 glued to the top of the rubber tube 20. The braided wire 32 providing the electrode is glued to the top surface of the bar 33 and has the two electrode tufts 28 formed by short lateral branches of wire braid soldered to the electrode 32. The free end-portion of the braided electrode 32 is gluded to the open end of the tube 20 so that its terminal portion hangs across the mouth of the tube. It is splayed out at this position which lies within the rage end 22 of the sheath 21, as shown at 29.

FIG. 5 shows the electrical circuitry in more detail. It comprises basically 6 units. The first unit is a time-controlled energisation circuit 40. The second unit 41 is a count recording circuit. The third unit 42 is a sound generating unit. The fourth unit 43 is an oscillator circuit The fifth unit 44 is a pulse shaping circuit. The final unit 45 is an audio amplifier which precedes the loud-speaker 8. These units will now be described individually. The unit 40 is powdered by the battery [19] and operates when the on/off switch 15 is closed and the push buttom 16 is pressed. This applies a bias to the input terminal of an integrated circuit component (IC type 556) which, for a predetermined period between 3 and 5 minutes applies a bias on an output terminal 9 to the base of an NPN transistor 60 (type BC 108) and to the input of the counting unit 41. The transistor 60 conducts for this predetermined period and causes operation of a relay 61 having a single, normally-open contact 62.

As long as the relay 61 is energised, the positive line of the battery [19] is applied to the sound generating unit 42. This contains an integrated circuit module 64 (type 566 UL) having its terminals connected as shown. Module 64 provides, with a like integrated circuit module 65, an oscillator which generates sound of constant amplitude in the form of pulses at a repetition rate of 1.5Hz. The fundamental frequency of the sound in each pulse sweeps upwardly from 700Hz to 1KHz. The actual range is capable of being adjusted by changing the settings of two variable resistors 66 connected to the terminals 6 and 3 of the module 64. Electrical component values are marked on the drawing.

The pulses provided by the unit 42 are fed through a coupling capacitor 67 to the input side of the amplifier unit 45 which supplies them to the loud-speaker 8. These pulses or bleeps of sound appear to emanate from the open rag-end 22 of the lure. These sounds have been found in practice to be of particular interest to a greyhound, possible because they cover a frequency range and have a repetition rate which the dog associates with a frightened animal.

The voltage from the relay contact 62 when it closes is fed to the oscillator unit 43. This comprises an integrated circuit component 68 (type 555 UL) connected so that it provides square output pulses, as shown by the wave form diagram, at a repetition rate of 1Hz. These pulses are supplied from terminal 3 of the component.

The square pulses from the unit 43 are fed to a pair of transistors 72, 73 of NPN type switching them "on" when the signal goes high and "off" when the signal goes low. The transistor 72 has the type number BC 549 and transistor 73 has the type number BD 139. The collectors of the two transistors are connected to one side of the primary of the transformer 74 and the emitters in series to ground. The other side of the transformer 74 primary is connected to the supply voltage via the parallel circuit formed by capacitor 70 and resistor 71 which will limit the instantaneous current drawn from the supply when transistors 72 and 73 conduct, i.e., turn on. The capacitor 70 charges up during the off period of the transistors 72 and 73 as shown by the wave form at cathode of diode 75 and supplies an instantaneous current to the transformer 74 primary when the transistors 73 and 74 switch on. The sudden change in current in the transformer 74 primary when transistors 72 and 73 switch on causes a high voltage impulse to be generated across the secondary of transformer 74. The duration of the high voltage impulse is determined by the inductance of the transformer 74 primary and the value of the capacitor 70.

The purpose of the diode 75 is to remove the possibility of the generation of a negative pulse when the transistors turn off. The output pulses obtained across the secondary of the transformer 74 have the shape shown in the wave diagram and are applied to the 3-position energisation switch 17. This is shown in its off position. Its other two positions determine respectively, whether the voltage applied to the electrode is to be at 150 volts or 100 volts. The pulses which are shown in the wave form diagram have a duration of 0.3millseconds and occur at a repetition rate of 1Hz.

A greyhound 90 is diagrammatically illustrated in FIGS. 1 and 5 showing interest in the open end of the pipe 20.

Each operation of unit 40 is recorded on a counter having an operating coil 91 shown in the counting unit 41. The input signal is received at terminal 6 of an integrated circuit component 92 (type 556) which responds by providing an output signal on terminal 5 which is applied to the base of an NPN transistor 93. The energisation coil of the counter 91 is connected in the collector circuit of the transistor 93 to operate when the transistor conducts.

OPERATION OF PREFERRED EMBODIMENT

When the lure is to be used its mounting plate 7 is slipped into the grooves 6. The lure energisation switch 17 is set to the position of stimulation required, either high or low according to the temperament of the dog and the conditions under which the lure is operating, and the switch 15 is then closed.

The dog which is to be stimulated is held on a lead by its trainer on the track. The press button 16 is operated and the counter unit 41 records the use. The relay 61 is energised for a predetermined period of 3 minutes and closes its contact 62 so that the sound generator operates and the electrode of the lure is energised with spiked pulses of voltage.

The lure is then driven along the rail at a reasonable speed towards and past the dog and is allowed to stop when about 20 feet away. The dog hears the sounds from the lure as it travels past and strains to move towards the lure. This movement is checked by the trainer in order to build up anticipation, but the dog is allowed to move forward slowly to the lure by the trainer.

When the dog reaches the lure his first action, if he has not encountered it before, is to investigate the source of the sound. To do this, he thrusts his muzzle into the rag-end 22 of the lure and immediately receives a muscle stimulus from the splayed out end of the electrode 32. This provides a "fight-back" stimulation and the dog immediately attempts to savage the lure. He encounters further stimulus pulses from the electrode tufts 28 and also, as the lure is bitten, from other parts of the lure as a result of it being wetted by his saliva so that a conductive path is formed through the sheath 21 from the electrode 32 by way of the holes 27.

The electrical stimulation provided by the electrode is quite harmless but acts on the dog as an additional stimulus as it represents to the dog a defensive behaviour of the lure which the dog is capable of overcoming. His belief strengthens that the lure is alive and fighting back. It may be that the satisfaction that the dog gets is the ability to savage the lure despite its providing a "fight-back" response simulating the struggles of a live animal. The satisfaction may also involve some form of mouth stimulation of the dog through the stimulus pulses which the dog finds satisfying. Whatever the cause of the satisfaction, his mental approach to chasing a racing lure, when schooled by the illustrated lure, is markedly increased or maintained at a high level and it has also been shown that by schooling racing greyhounds at regular intervals they will maintain a greater effort in chasing a conventional racing lure than is the case if they are not so schooled.

The trainer allows the dog to attack the lure in a moderate way so that he does not overstrain himself, but sufficiently for the dog to get the "fight-back" stimulation.

After the end of the predetermined 3 minutes of use power supply unit 40 operates to de-energise the sound generating unit 42 of the lure which becomes mute and the unit 43 is no longer electrically energised either.

A second way of using the lure is to sharpen up the speed with which a greyhound leaves a starting box.

In this method os use, the lure shown in FIG. 1 is attached to the trolley 6 which also carried the conventional racing lure. The lure assembly is driven past the boxes at normal racing speed so that the dog has the usual race start. When the lure assembly has passed about 60 feet beyond the starting boxes, it is allowed to coast to a stop to allow the dog to catch it and to be stimulated by direct attack. In this way, the dog achieves satisfaction from catching the lure so that the dog does not develop a sense of frustration from never catching a racing lure.

It will be appreciated that this method of training a dog to catch a lure is particularly good for young dogs learning to race and also for slow beginners.

A third method of use of the lure is to develop the idea in the dog's mind of increasing his speed as the winning post is approached. This is useful for racing dogs and also for young dogs learning to race and can be applied to both circular and straight dog racing tracks.

The dog is started in a conventional way from a shortdistance box so that he does not tire before stimulation. A normal racing lure is used for the dog to chase, but the stimulation lure shown in FIG. 2, is positioned in a corner of the catching pen into which the dog travels at the end of the race and not far away from the gate through which the racing lure disappears. When the dog reaches the catching pen, the lure that he has been chasing disappears, but instead, he is confronted with a second lure which is emitting sounds and appears to be alive. The dog will immediately attack it and will receive the electrical "fight-back" stimulation which will continue for some minutes. The strength of the electrical signal will have been previously set to suit the dog's temperament and his previous experience with the lure.

MODIFICATIONS OF THE INVENTION

Various modifications to the above described apparatus are possible. For example, the sound generating part of the lure may be arranged to be operated independently of the energisation of the lure electrode which may also be independently operated by manual switching. Additional stimulation can be given to the lure by scenting the hide cover with an animal smell such as possum smell. Also, the parameters of the electrical signal applied to the lure may be steplessly changeable to suit different dogs. In this case the switch 17 is replaced by a potentiometer control. Also, the pulse repetition rate of the voltage spikes applied to the electrode may be varied as well as the wave form of the spikes.

Although the sounds produced by the generator described above have been found to be suitable for attracting a racing greyhound, it is also possible to arrange for the lure to produce different sounds in different situations. For example the bleep-sound of a lure spaced some way from a dog immediately attracts its attention and if the pitch of the sound is raised as the dog approaches the lure it enhances the impression to the dog that the lure is becoming frightened. When the dog is close to the lure, controls may be arranged for an operator spaced remotely from the lure to change the sound to a hissing sound such as is made by a cat when a dog is close to it. It has been found that such sounds may increase a greyhounds instincts to attack the lure.

When the lure has been used a number of times the hide cover becomes torn and has to be replaced. This is simply achieved by withdrawing the plug 30 from the socket connector 13 and undoing the jubilee chip 11. The pipe section 10 together with the lure can then be removed from the tubular nozzle and replaced with a new lure. The used lure can then be repaired at leisure.

The purpose of the counting unit 41 is to enable the apparatus to be hired out on a rental basis.

In a further modification the lure is provided with two spaced electrodes and a two-wire system of energising them is used rather than an earth return provided by the dog.

It will also be appreciated that the conventional racing lure can be replaced by the lure of the invention without the units 41,43 and 44 being energised. The lure is by then familiar to the dogs and emits the sound they know from past experience, is that produced by a lure they are capable of catching and that when caught, gives them satisfaction.

The electrical resistance of a greyhound may be determined by connecting a high resistance ohm-meter between an electrode placed in the dogs mouth and an electrode plate placed on the ground upon which the dog stands is found in practice that the electrical resistance of a dog measured this way can vary greatly and this should be taken into account when setting the voltage of the pulses fed to the electrode of the lure when a dog is to be schooled which has not encountered the lure before.

We claim:

1. Greyhound conditioning apparatus, comprising a lure, an electrode on said lure, an electrical power source, and circuit means energised by said source and connected to said electrode whereby a greyhound attacking the lure receives from said electrode an electrical "fight-back" stimulus of sufficiently short time duration not to shock or frighten a greyhound but rather to stimulate the greyhound to attack the lure in the belief that said lure is alive.

2. Apparatus as set forth in claim 1, including sound generating means to attract the greyhounds attention to the lure.

3. Apparatus as set forth in claim 2, in which the sound generating means comprises a hollow, open-ended tube connected at one end to a sound source remote from the lure and having its other end on the lure, a part of said electrode being positioned adjacent said other end.

4. Apparatus as set forth in claim 3, in which the tube provides a flexible mount for the lure and is made from an insulative material, said tube being releasably connected to a nozzle on a mount which carries said power source and said electrical circuitry, a loud-speaker arranged to direct to direct sound into the nozzle and disconnectable electrical means on said pipe connecting said electrode to said electrical circuitry.

5. Greyhound conditioning apparatus comprising a lure, a padding on said lure, a removeable sheath on said padding, an electrode beneath said sheath, openings defined by said sheath and through which said electrode is partially exposed, an electrical power source, circuit means electrically connected between said power source and said electrode, and sound generating means energised from said power source whereby the sounds generated attract a greyhounds attention to the lure and electrical stimulus received from the electrode when the greyhound touches the lure encourages the greyhound to attack the lure.

6. Apparatus as set forth in claim 5, in which said sheath has an open end, a part of said electrode is located within said open end, and said sound generating means produce sounds which appear to emanate from said open end.

7. Apparatus as set forth in claim 6, in which said electrode has at least one tuft electrode branching from it through said sheath and splayed out on the outside of said sheath.

8. Apparatus as claimed in claim 7, including an insulative open-ended pipe having said padding fixed on one end-portion the end of which lies within the open end of said sheath, the other end-portion of said pipe projecting from a second end of said sheath to provide a resiliently flexible mount for said lure, a releasable means connecting the other end of said pipe to receive sound signals from a loudspeaker remote from said sheath, and an electrical lead extending from a releasable connector at said other end of said pipe, into said pipe and connected to said electrode.

9. Greyhound conditioning apparatus comprising a lure, an electrode on said lure, a mount for said lure and spaced therefrom, an electrical power source on said mount, a housing on said mount, electrical circuitry in said housing energisably connected to said power source, first electrical connections extending from said circuitry to the electrode on said lure, a loudspeaker on said mount, second electrical connections extending from the electrical circuitry to said loudspeaker, a flexible open-ended tube extending from said lure to said mount, releasable connection means attaching said tube to said mount at the position of said loudspeaker, and a portion of said electrode disposed adjacent the end of said tube remote from said mount, and further portions of said electrode exposed on the outside of said lure.

10. Apparatus as set forth in claim 9, in which the electrical circuitry includes a counting unit which records each time the lure is turned on, the circuitry is arranged to energy the loudspeaker to produce bleeps of sound of substantially constant amplitude and which sweeps, in each bleep, upwardly through a range of frequencies from 700Hz to 1000Hz, the bleep repetition rate is between 1Hz and 1½Hz, the circuitry energizes the lure electrode with spikes of voltage between 40 volts and 150 volts with a repetition rate of between 1Hz and 2Hz, the duration of each voltage spike is substantially 0.3 milliseconds, and manually operable controls enable the electrical characteristics of the pulses fed to the electrode to be altered to suit the greyhound being conditioned.

* * * * *